US011663763B2

(12) United States Patent
Fisher et al.

(10) Patent No.: US 11,663,763 B2
(45) Date of Patent: May 30, 2023

(54) IMAGE-TO-IMAGE TRANSLATION USING AN AUTO-REGRESSIVE GENERATIVE MODEL

(71) Applicant: Adobe Inc., San Jose, CA (US)

(72) Inventors: Matthew David Fisher, San Carlos, CA (US); Vineet Batra, Delhi (IN); Sumit Dhingra, Delhi (IN); Praveen Kumar Dhanuka, Howrah (IN); Deepali Aneja, Seattle, WA (US); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/452,217

(22) Filed: Oct. 25, 2021

(65) Prior Publication Data
US 2023/0131321 A1    Apr. 27, 2023

(51) Int. Cl.
*G06T 9/00* (2006.01)
*G06T 11/60* (2006.01)
*G06T 5/50* (2006.01)
*G06T 11/00* (2006.01)
*G06T 11/20* (2006.01)

(52) U.S. Cl.
CPC ............ *G06T 11/60* (2013.01); *G06T 5/50* (2013.01); *G06T 9/002* (2013.01); *G06T 11/001* (2013.01); *G06T 11/203* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

2020/0013205 A1*   1/2020   Kavidayal ............ G06N 3/0472

OTHER PUBLICATIONS

Esser, P. et al., "Taming Transformers for High-Resolution Image Synthesis (AKA #Vqgan)," CVPR 2021, pp. 1-16 (oral), retrieved via Internet: https://compvis.github.io/taming-transformers/.
Isola, P. et al., "Image-to-Image Translation with Conditional Adversarial Networks," 2017 IEEE Conference on Computer Vision and Pattern Recognition (CVPR), Jul. 2017, arXiv:1611.07004v3, 17 pages.
Mildenhall, B. et al., "NeRF: Representing Scenes as Neural Radiance Fields for View Synthesis," arXiv:2003.08934v2, Aug. 3, 2020, 25 pages.
Zhu, J. et al., "Unpaired Image-to-Image Translation Using Cycle-Consistent Adversarial Networks," 2017 IEEE International Conference on Computer Vision (ICCV), Oct. 2017, pp. 2242-2251.
Zhu, J.-Y. et al., "Toward Multimodal Image-to-Image Translation," 31st Conference on Neural Information Processing Systems (NIPS 2017), Dec. 4, 2017, pp. 465-476.

* cited by examiner

*Primary Examiner* — Yanna Wu
(74) *Attorney, Agent, or Firm* — Nicholson De Vos Webster & Elliott LLP

(57) ABSTRACT

A computer-implemented method including receiving an input image at a first image stage and receiving a request to generate a plurality of variations of the input image at a second image stage. The method including generating, using an auto-regressive generative deep learning model, the plurality of variations of the input image at the second image stage and outputting the plurality of variations of the input image at the second image stage.

19 Claims, 14 Drawing Sheets
(2 of 14 Drawing Sheet(s) Filed in Color)

US 11,663,763 B2

IMAGE-TO-IMAGE TRANSLATION USING AN AUTO-REGRESSIVE GENERATIVE MODEL

BACKGROUND

Image-to-image translation involves generating a new version of a given image, with a specific modification, such as translating an image from day to night, or summer to winter. There are a number of approaches to implement such image-to-image translation.

For example, Taming Transformers provides image synthesis. However, experimental results show that Taming Transformers has significant reconstruction loss in the decoder and generation is always performed in scanline order so it is difficult to apply user constraints. Furthermore, the image synthesis does not do a good job of following the high frequency details of input content.

These and other problems exist with regard to existing image-to-image translations in electronic systems.

SUMMARY

Introduced here are techniques/technologies that create a set of possible next stage images, from an original image. The process is designed to create a later stage image from an initial image using an auto-regressive generative deep learning system. The initial image may be a vector drawing, and the system creates a set of potential colored versions. Or the initial image may be a colored image, and the system creates a set of potential shadings. After the system is run, in one embodiment, the artists can browse the selection of possible color and shading suggestions and choose whatever one they like, to continue creating.

More specifically, in one or more embodiments, a two-stage system extracts the incremental knowledge to determine the second stage from the first stage, using a residual network encoder. The system then uses a bucket index of the incremental knowledge and a hint mask and hint value in a probability density calculator to derive potential next stage images. This auto-regressive generative deep learning system produces a set of possible next stage images, which may then be adapted by the user. In some embodiments, the user may apply arbitrary constraints to the learning system.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying drawings in which.

DETAILED DESCRIPTION

One or more embodiments of the present disclosure include an image stage system designed to assist creators in generating images that give them a creative boost by helping them visualize possible updated versions of their image at the next stage. The image stage system takes an image in a first state, and automatically generates multiple versions of a second, subsequent, state. For example, the image stage system may take a vector sketch and automatically suggests multiple possible ways to color and/or shade it. In one embodiment, the input can be either a sketch or vectorized strokes. In one embodiment, the color and shading variations that are generated are both easily interchangeable and vectorized to match the input vector drawing, for easy editing and integration with the existing artwork. After the system is run, in one embodiment, the artists can browse the set of color and shading suggestions and choose one or more for further editing or use. If they create their own coloring or modify an existing coloring, they can create new shading options based on their colorization or partial colorization. Artists can optionally have high-level control over the generated layers such as suggesting the light direction for shading.

The image stage system in one embodiment, utilizes a series of deep networks developed and trained on a dataset of layered vector artwork. The learned generative model is able to generate multiple color predictions given the input vector drawing. The model may be trained to create the shading layer conditional on the color layer. In both cases, constraints can be provided allowing the network to incorporate lighting or color guidance from the artist. The generative model is auto-regressive, which means that it starts by guessing some part of the image (for example, "hair should be black") and then spirals outward from this decision. The autoregressive nature of the model makes it easy to generate diverse options for display. Because the results are vectorized, it is easy for the artist to continue to edit and refine the color and shading suggestions.

In the below description, an example of adding color to a line drawing will be used as the primary example, with some discussion of other stages, such as adding shading to a flat color drawing. A line drawing may be a vector drawing, a raster drawing, or another format of line drawing. A flat color drawing uses a single color across an area, with no shading. However, it should be understood that the described process can be used for other stages. For example, the system may be used, in one embodiment, to add reflections or material effects to materials, such as wear or weathering to bricks or other materials, or reflections to a lake or mirror. The system may in one embodiment be used to add a global effect to an image, such as changing the time of day, changing seasons, aging or de-aging a scene.

Figure 1:
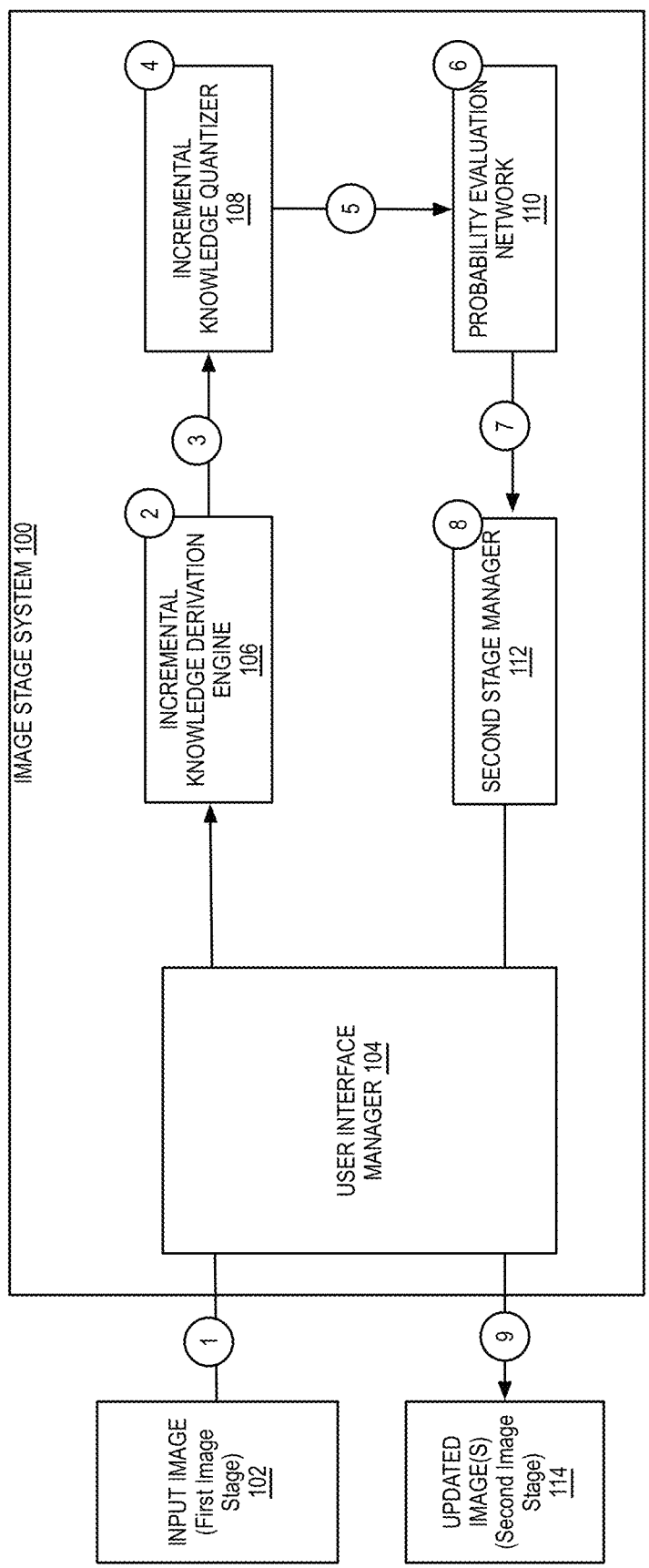
FIG. 1 illustrates a diagram of an image stage system in accordance with one or more embodiments.

FIG. 1 illustrates a diagram of an image stage system in accordance with one or more embodiments. The input image 102 at the first image stage, is received from a user. The input image 102 may be a vector drawing, a colored drawing, a sketch, or another image format for update. The input image 102 may be received from a user. The input image is provided to the system, in one embodiment, via user interface manager 104. The user interface manager 104 may be part of a larger drawing system which allows users to create vector drawings and/or apply color and shading.

The input image 102 is passed to incremental knowledge derivation engine 106. The incremental knowledge derivation engine 106 is a neural network trained on paired sets of drawings, to derive incremental knowledge of the next stage based on the current stage of the drawing. For a vector drawing, the incremental knowledge in one embodiment indicates the colors associated with the vector drawing shapes. For a flat colored drawing, the incremental knowledge in one embodiment indicates the position and color of shading that is added to the flat colored image. The flat color drawing uses a single color for each area and does not include shading. The shading, in one embodiment, overlays a shape and tonally different color, over a portion of an area, to represent the effect of lighting on the image.

The incremental knowledge quantizer 108 quantizes the incremental knowledge, received from derivation engine 106 into a plurality of buckets. The quantization enables the use of the incremental knowledge by the probability evaluation network 110.

The probability evaluation network is a neural network that determines the probability distribution for the colors, shades, or other next stage layer elements. The output of the probability network is one potential next stage image for each time it is run, in one embodiment.

Second stage manager 112 receives this data and selects the one or more potential second stage images for display via user interface manager 104. The updated images 114 are output to the user. The user may then select an image for further editing. In some embodiments the image stage system 100 is run multiple times by the user. In some embodiments, the user selects one of the updated images 114, and utilizes a second version of the image stage system 100 to further update the image. For example, the first image stage system 100 may receive as an input image 102 a vector drawing, and output a set of possible colored versions of the image. The user then may select one of the colored versions, and have the second image system 100 apply shading. In one embodiment, the first image system and second image system utilize the same set of stages, and are trained on different data sets. In some embodiments, the same image stage system may support multiple stages. For example, the image stage system may have a first module trained to produce color variations for an input vector image and a second module trained to produce shading variations for an input colorized vector image. Additionally, or alternatively, the image stage system may support different stages as well. For example, the image stage system may include a module trained to produce a vector image for an input sketch or raster image.

Figure 2A:
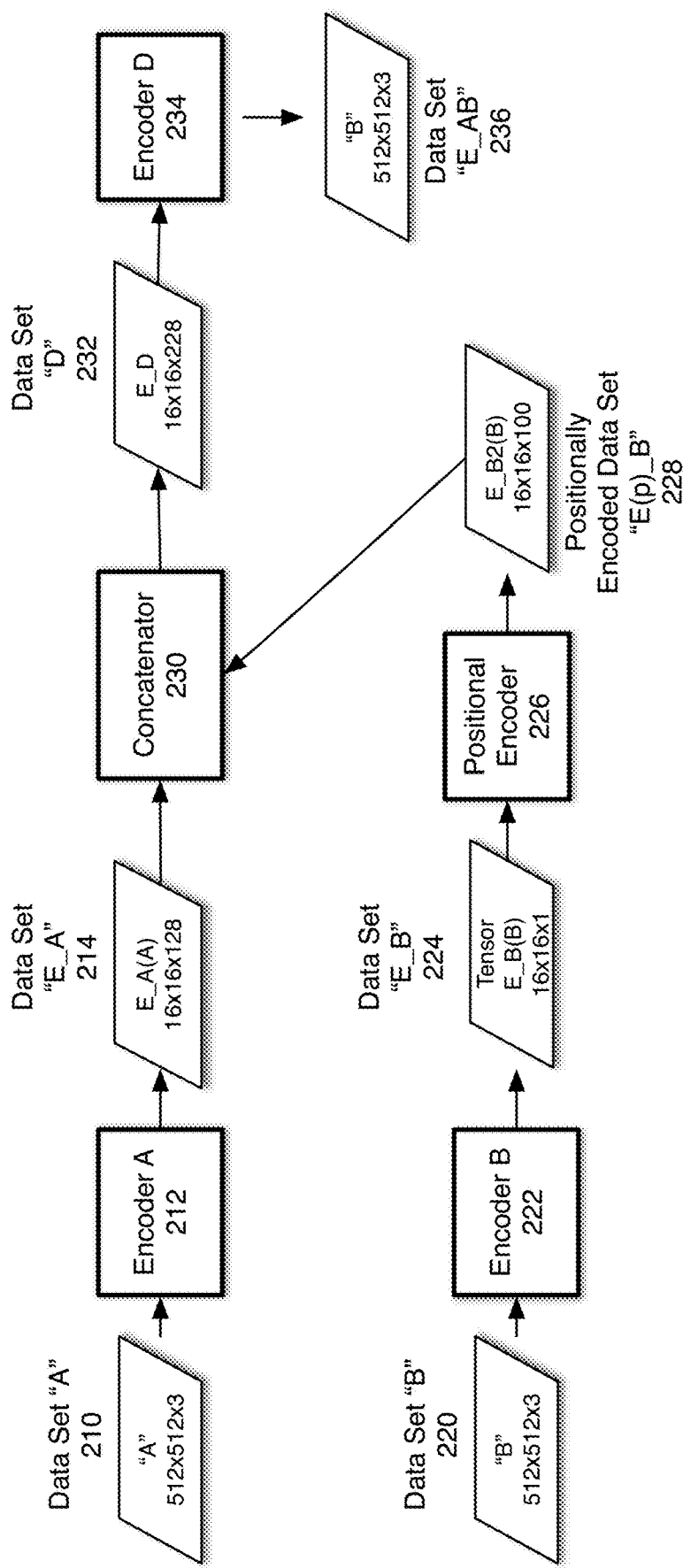
FIG. 2A illustrates a diagram of the first stage of the guided encoder-decoder architecture in accordance with one or more embodiments.
Figure 2B:
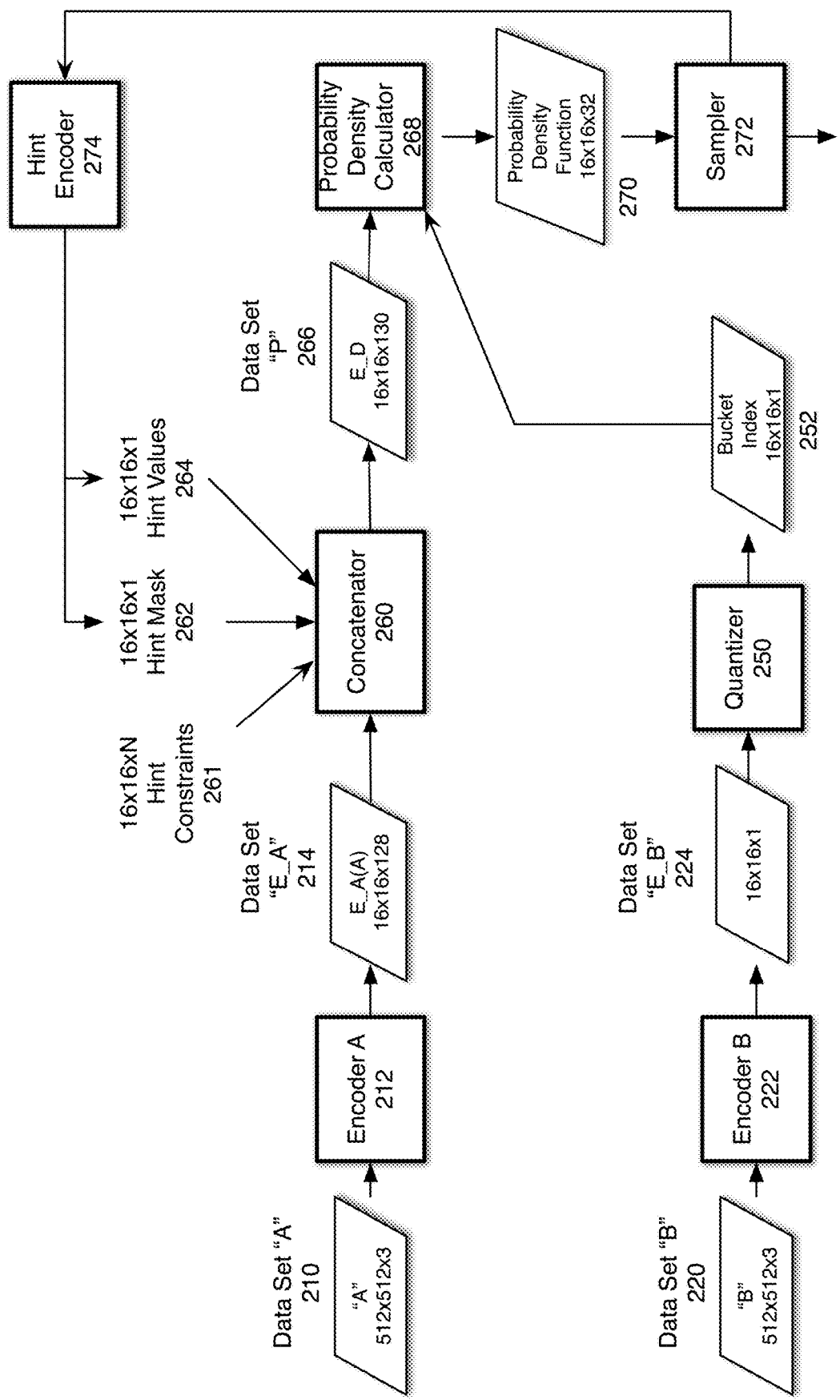
FIG. 2B illustrates a diagram of the second stage of the guided encoder-decoder architecture in accordance with one or more embodiments.

FIG. 2A and FIG. 2B illustrate a neural network system utilizing a two-stage guided encoder-decoder architecture in accordance with one or more embodiments. FIGS. 2A and 2B provide a more detailed embodiment of the incremental knowledge derivation engine 106, quantizer 108, and probability evaluation network 110 of FIG. 1.

FIG. 2A illustrates a diagram of the first stage of the guided encoder-decoder architecture in accordance with one or more embodiments. The training data includes data set A 210 and data set B 220. In this example, both are 512×512×3. However, this is merely an exemplary size, and one of skill in the art would understand that other sizes may be used. In one embodiment, the sizes of data set A 210 and data set B 220 are matched.

Data set A 210 is encoded, through encoder A 212 into a high-bandwidth, low-spatial-dimension feature space, data set E_A 214, which in one embodiment is 16×16×128. Encoder A 212 in one embodiment a residual network encoder which repeats two residual blocks followed by a down-sampling layer. Encoder A 212 may be a diffusion network.

Data set B 220 is encoded through encoder B 222 into a low-bandwidth, low-spatial-dimension feature space that is tightly compressed. In one embodiment, encoded data set E_B 224 is a 16×16×1 tensor. The encoded data set E_B 224 represents only the incremental information between the data set A 210 and data set B 220. This tightly encodes only the incremental information (e.g., only color and position) without the geometric details provided by data set A.

The encoder B 222 is a residual network encoder with repeats two residual blocks followed by down sampling layers until the goal size is achieved. In one embodiment, five down sampling layers are used. In another embodiment, a diffusion network may be used. Other standard decoder or encoders may be used. In one embodiment, the data set E_B 224 is then passed through a positional encoder 226, to produce positionally encoded data set E(p)_B 228.

The positional encoder 226 in one embodiment applies fixed sine/cosine components to the inputs and amplifies the input channels. Positional encoding maps each of the floating point values independently through a series of singe and cosine functions, in one embodiment. In one embodiment, the positional encoding is repeated to put the size of E(p)_B 228 on equal footing with the size of E_A 214.

The two encoded data sets, E_A 214 and E(p)_B 228 are then concatenated through concatenator 230, output as E_D 232. Because the two data sets are concatenated, the size of E_D 232 is larger, at 16×16×228. Encoder D 234 then encodes the concatenated data set, to reconstruct data set B. The output of encoder D 234 is the same dimension as data set B, 512×512×3, and is referred to as data set E_AB 236. Encoder D 234 may be any encoder or decoder, but in one embodiment is a residual network encoder.

The reconstruction loss between data set E_AB 236 and data set B 220 is minimal. Experimental results show that using this approach has minimal reconstruction loss, compared to utilizing a Taming Transformers encoding mechanism, which produced a significant reconstruction loss in the decoder.

In one embodiment, these networks, encoder A 212, encoder B 222, and encoder D 234 are trained on sets of paired AB images. In one embodiment, an optimizer is used during the training, as is known in the art. In one embodiment, the Adam optimizer in PyTorch is used with a learning rate of 1e-4. The output of "E_B" is the end result used in stage two, below. E_B 224 is low dimensional, and encodes only the "extra" or incremental knowledge needed to determine "B" from "A". For example, if the first and second stages are "vector" and "color" respectively, and "A" is a picture of an apple, then the 16×16×1 tensor of E_B(B) 224 might encode details such as "what color of apple is it" and "what color is the stem". It does not need to encode the complex geometry of "A" that is represented in E_A(A).

FIG. 2B illustrates a diagram of the second stage of the guided encoder-decoder architecture in accordance with one or more embodiments. The values of E_A(A) 214 and E_B(B) 224 are fixed from the first stage, described above. In one embodiment, the values of E_B(B) 224 are quantized into a discrete set of buckets, by quantizer 250. The output of quantizer 250 is a bucket index 252 that is a 16×16×1 set of integers. In one embodiment, thirty-two (32) buckets are used, and the integer values range 0 to 31. Other quantization may be used. The quantizer 250 simply quantizes the output of E_B(B) to the index of the closest bucket.

Figure 8:
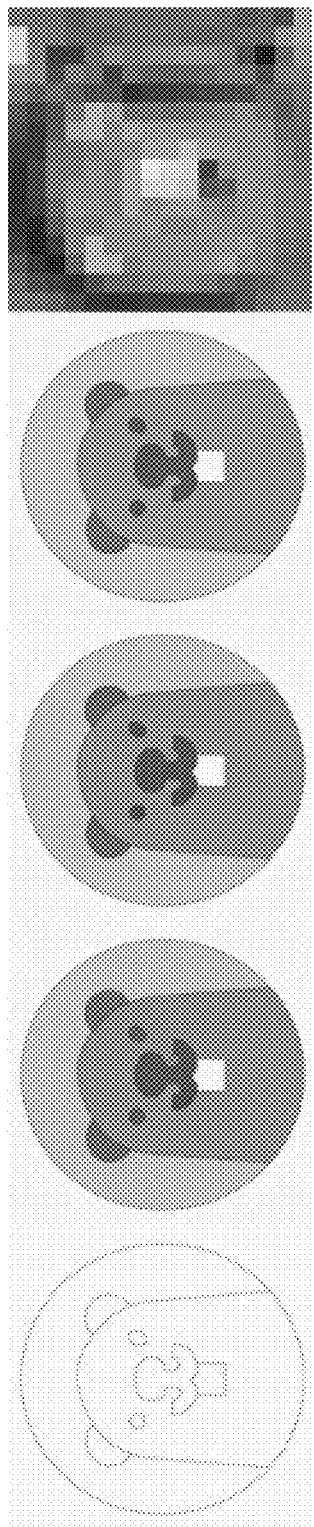
FIG. 8 illustrates an exemplary image, and associated set of iterations and a visualization of the bucketized incremental data for an image in accordance with one or more embodiments.

FIG. 8 illustrates the visual representation of the results of the intermediate components of a vector to color image stage system. In general, such images are not generated, but this representation shows the differences at various phase of stage one. The first image is the vector raster image. The second image is the output of encoder D, without quantization. The third image is the output of encoder D with quantization. The fourth image is the ground truth target B, which was the starting image. The fifth and final image is the visualization of the E_B(B), with values mapped from black to white. The visualization of E_B(B) represents the very small 16×16×1 space, but it represents the high level features of the colors. The quantization has no perceivable reduction in the encoding quality.

Returning to FIG. 2B, the concatenator 260 utilizes hint constraints 261, hint values 264 and hint mask 262. The hint values 264 indicate the value of one or more pixels within the data set E_B that have been selected, as will be described below. The hint mask 262 identifies the position of the hint values that have been calculated. Initially, in one embodiment, the "hint value" 264 and "hint mask" 262 are set to 0s, indicating that no values have been selected yet. The size of the hint values and hint mask are matched. In one embodiment both are 16×16×1. The hint constraints in one embodiment are an additional channel of data, into which user constraints are encoded. The size of the hint constraints is matched to the hint values and hint mask, 16×16×N. The N represents the one or more elements of the constraint. In one embodiment, if there are no user provided constraints, the hint constraints 261 are set to zero. However, constraints such as color may be encoded in three channels (e.g., red, green, blue), thus having hint constraints 261 of 16×16×3, with one channel per color. Shadow depth, the color of the light, position of a spot light or multiple lights may also be encoded as hint constraints 261. Each type of data, in one embodiment, provides one or more layer in the hint constraints 261.

The values of E_A(A) 214, previously calculated, the hint constraints 261, hint value 264, and the hint mask 262, are concatenated by concatenator 260, to output data set P 266. Data set P 266 is the input to the probability density calculator 268.

Probability density calculator 268 network is the network trained in this stage. The probability density calculator 268 may be any network. In one embodiment, a six residual block network is used. Other convolutional neural networks may be used for the probability density calculator 268. The output of probability density calculator 268 are class probabilities over each of the values of E_B(B). The cross-entropy loss encourages P to correctly predict the distribution over E_B(B). In one embodiment, the probability density calculator 268 network is also trained using the Adam optimizer of PyTorch, with standard parameters and a learning rate of 1e-4.

The probability density calculator 268 will predict distributions over the values of the bucket index values of B. In one embodiment, this is a probability density function 270 over the 32 possible discrete bucket values. Each of these 16×16 values represents some part of the information needed to determine "B" incrementally from "A".

Once the probability density function 270 has been calculated, sampler 272 samples E_B(B) from the output of the probability calculator 268. In one embodiment, sampling is done in a precise order. Sampler 272 first picks a random X/Y pixel as its starting point in the 16×16 feature space, and then samples from that starting point according to the probability density function 270.

The corresponding sampled X/Y value is encoded as a "hint value" and the corresponding "hint mask" position is marked as 1 by hint encoder 274. This lets the network know about the selected value at the starting point pixel X/Y.

The concatenator 260 and probability density calculator 268 are rerun. The concatenator 260 now incorporates the decisions that were made in E_B(B)'s encoding at the prior pixel X/Y via hint mask 262 and hint value 264, while also incorporating the unchanged hint constraints 261.

The sampler 272 then samples E_B(B) based on a nearby point, say X+1/Y. The hint encoder 274 encodes the selected new value into "hint value" and "hint mask." This process is repeated until all values in E_B(B) are sampled, in one embodiment. The system use any order of X/Y points, for example, a scanline or a spiral order. The images and test results described use a spiral order. However, in some embodiments, each of the 16×16 values could be sampled independently from the distribution. And of course, while the size 16×16 is described, the actual size of the data set, mask, and hints is arbitrary and could be chosen to be any value.

At test time, this approach can be used to sample plausible E_B(B) by picking different X/Y and sampling new values in some order (ex. spiral.) Each such sample S=E_B(B) can then be reconstructed using the first stage of the decoder network, i.e., the portion of the network illustrated in FIG. 2A. The first stage computes D(E_A(A), S), or data set E_AB. This is the final output of the system: given A, after sampling many plausible E_B(B), the system returns newly sampled images B. The above process can be modified based on user constraints, as will be discussed below.

Figure 9A:
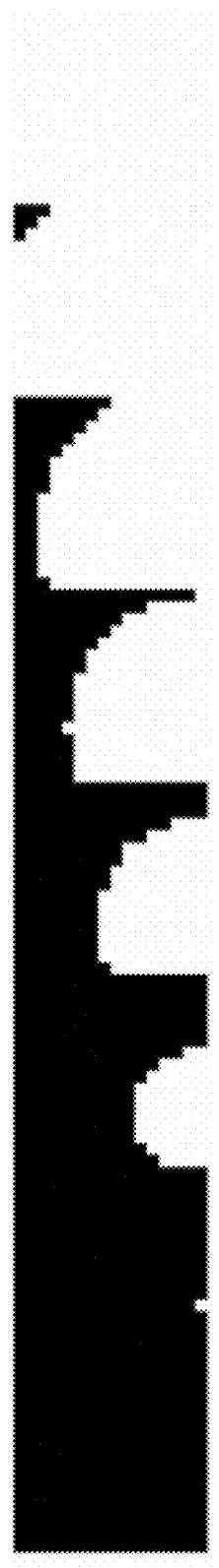
FIGS. 9A and 9B illustrate an exemplary hint mask and iterative probability images over the domain at each stage in accordance with one or more embodiments.
Figure 9B:
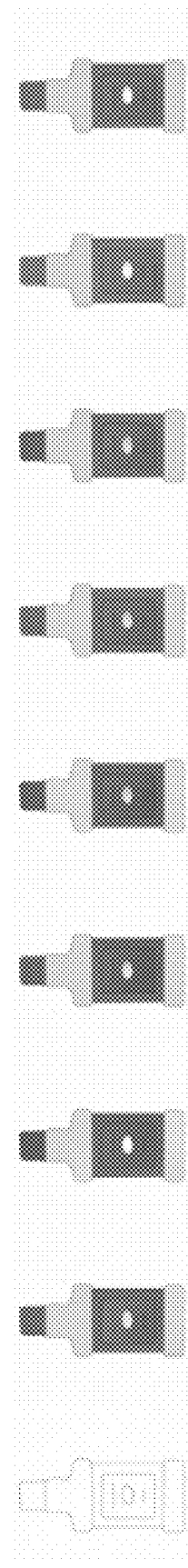

FIGS. 9A and 9B illustrate an exemplary hint mask and iterative probability images over the domain at each stage in accordance with one or more embodiments. FIG. 9A shows the iteration of the hint mask as the process is run, using a spiral sampling approach. FIG. 9B illustrates exemplary images calculated as a full probability image over the data at each stage. These images would not be generated normally, but rather are merely shown as illustration.

Figure 3A:
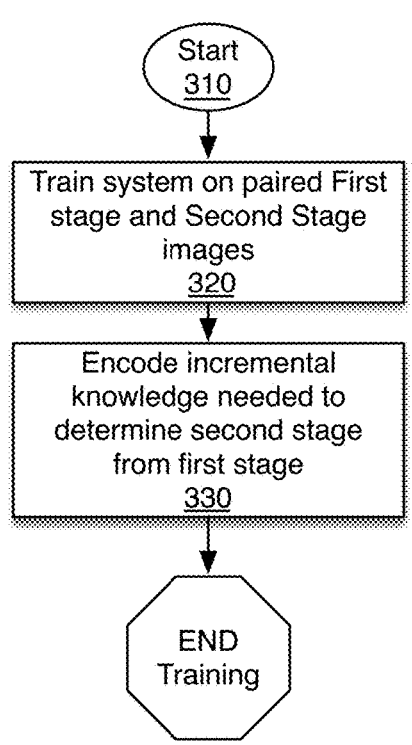
FIGS. 3A and 3B illustrate flowcharts of a series of acts in a method of training and utilizing the image stage system in accordance with one or more embodiments.
Figure 3B:
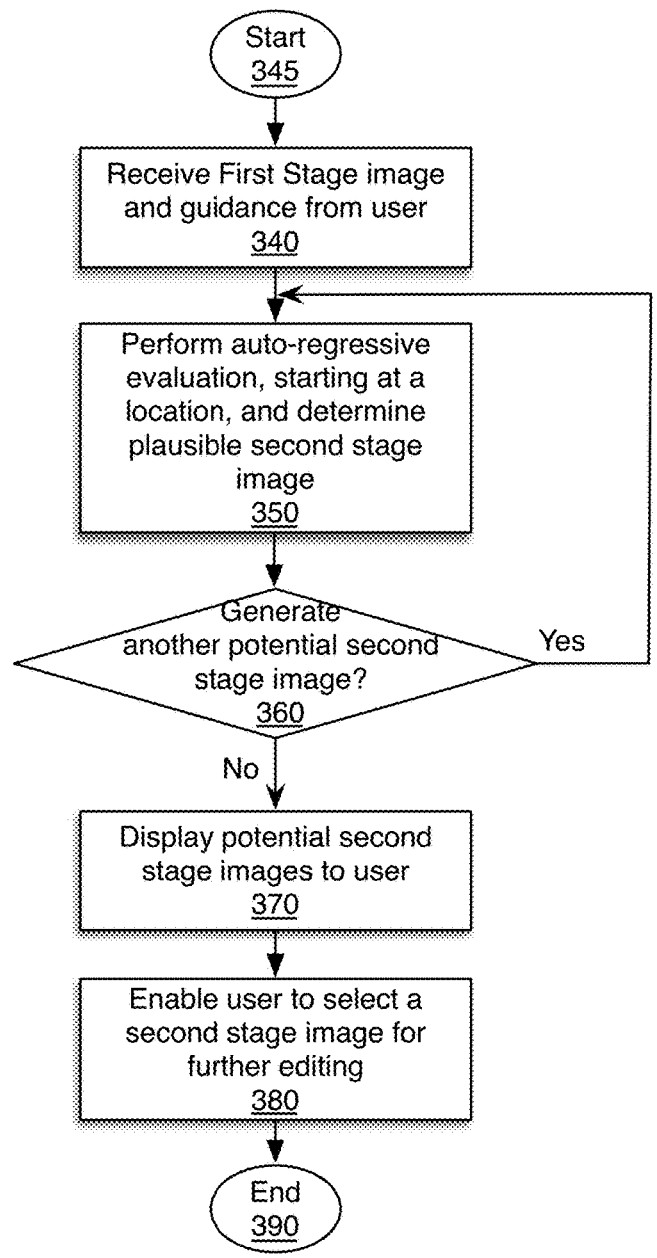

FIGS. 3A and 3B illustrate a flowchart of a series of acts in a method of training and utilizing the image stage system in accordance with one or more embodiments.

Figure 5:
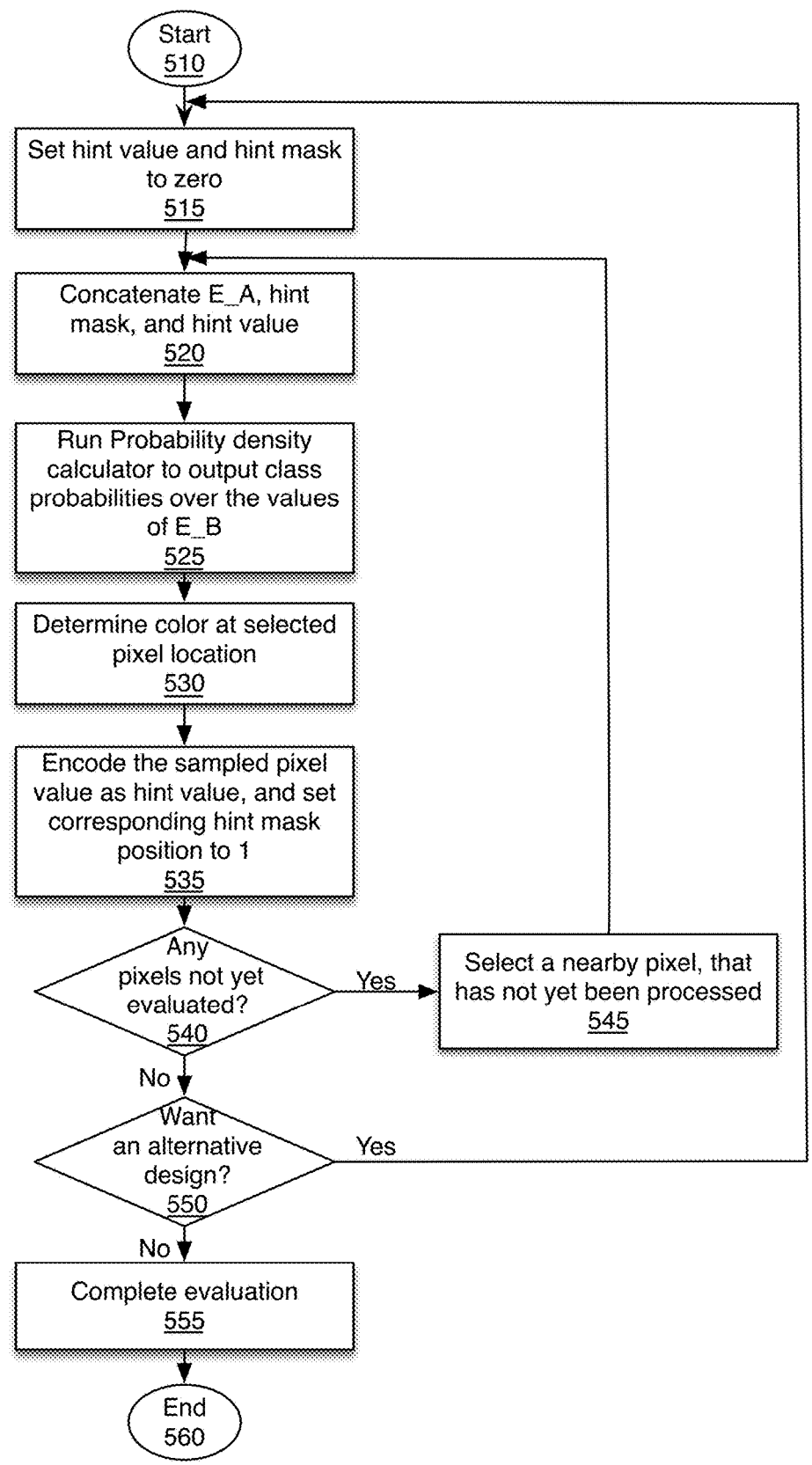
FIG. 5 illustrates a flowchart of a series of acts in a method of using the deep learning system in accordance with one or more embodiments.

The process starts at block 310. At block 320, the system is trained with paired first stage and second stage images. In one embodiment, the training process described above with respect to FIGS. 2A and 2B may be used. FIG. 5 provides additional details for the training process.

At block 330, the incremental knowledge to determine the second stage from the first stage is encoded. This is referred to as the E_B(B) data set above. The incremental knowledge is stored, and made available to the neural network for use. This ends the training process illustrated in FIG. 3A.

FIG. 3B starts at block 335. At block 340, a first stage image is received. In one embodiment, optionally, guidance from the user is received as well. The guidance from the user may be a particular preferred color for a certain portion of the image for a color application, a light source location and/or particular angle of light striking the image for a shadowing application, etc.

At block 350, an auto-regressive evaluation is performed, to determine a plausible second image. The evaluation is started from a location, and spiraled outward, in one embodiment. In one embodiment, the location is randomly selected, if there is no user guidance. If there is user guidance, the starting position, hint constraints, hint values, and/or hint mask may be adjusted as well, based on the user provided constraints. In some embodiments, the area over which the system performs its evaluation may also be limited.

At block 360, the system determines whether another potential second stage image should be generated. In one embodiment, the system has a default number of potential images generated. In one embodiment, the system by default generates five potential images. In one embodiment, the user may specify the number of variations they would like to see. If there are more images to be generated, the process returns to block 350, to select a new starting location—optionally constrained by the user's guidance, to generate another plausible second stage image. If no more images will be generated, at block 370, the potential second stage images are displayed to the user.

At block 380, the system enables the user to select one or more of the second stage images for further editing. The process then ends at block 390.

Figure 4:
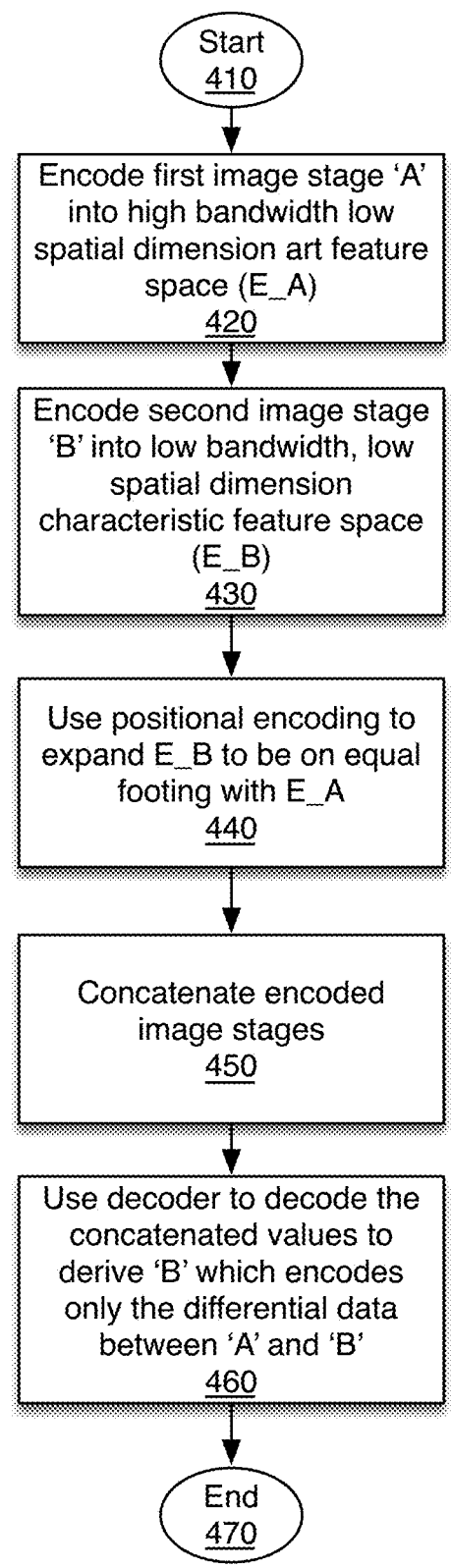
FIG. 4 illustrates a flowchart of a series of acts in a method of deriving the differential data in training system in accordance with one or more embodiments.

FIG. 4 illustrates a flowchart of a series of acts in a method of deriving the differential data in training system in accordance with one or more embodiments. The process starts at block 410. At block 420, the first image stage "A" is encoded into a high bandwidth, low spatial dimension art feature space (data set E_A).

At block 430, the second image stage "B" is encoded into a low bandwidth, low spatial dimension characteristic feature space (data set E_B). Data set E_B represents the differential between the two image stages.

At block 440, the system uses positional encoding to expand data set E_B to be on an equal footing with data set E_A.

At block 450, the system concatenates E_A and E_B. This produces a larger data space, referred to as E_D.

At block 460, the decoder is used to decode the concatenated values to derive data set 'B', which encodes only the differential data between data set A and B. The derived data set has minimal reconstruction loss, compared to the original data set B. The training system is used to train encoders A, B, and D. The process then ends at block 470.

FIG. 5 illustrates a flowchart of a series of acts in a method of using the deep learning system in accordance with one or more embodiments. The process starts at block 510. In one embodiment, the system quantizes each value of E_B, the encoded data set into a discrete set of buckets. This shifts the values of E_B from floating point to integer values. The number of buckets defines the range of values for the E_B data set. In one embodiment, 32 buckets are used, with data values for E_B ranging from 0 to 31.

At block 515, the hint value and hint mask are set to zero.

At block 520, the data set is concatenated E_A with a hint mask and hint value. In one embodiment, the hint value is set to zero, and so is the hint mask, indicating that no hint values are available. As noted above, in some embodiments if user guidance is provided, the hint values may be changed, and the associated hint mask portions set to one, indicating that hint data is available.

At block 525, the probability density calculator calculates a probability density function, which predicts the probability distributions over the quantized values of B.

At block 530, the color is determined for a pixel location. In one embodiment, the system randomly selects a first pixel. In another embodiment, if a user guidance is available, the first pixel selection may be made based on the user guidance.

At block 535, the encoded sample pixel is encoded as hint value, and sets the corresponding position in the hint mask to 1.

At block 540, the process determines whether there are any pixels remain unevaluated. If so, at block 454 a nearby pixel that has not yet been processed is selected, at block 645. In one embodiment, the nearby pixels are selected in a spiral pattern, such that the evaluation spirals out from the originally selected pixel. The process then returns to block 620, to concatenate E_A with the newly updated hint mask and hint value.

If no pixels remain unevaluated, at block 550, the process finalizes this particular potential design, and determines whether an alternative design is requested. If so, the process returns to block 515, resetting the hint value and hint mask value, to start the process anew.

At block 555, the evaluation is completed. In one embodiment, the system utilizes the encoding mechanism described above in blocks 440-460, to obtain the reconstructed value for dataset B, which is the updated image, at the next image stage. The process then ends at block 560.

Figure 6:
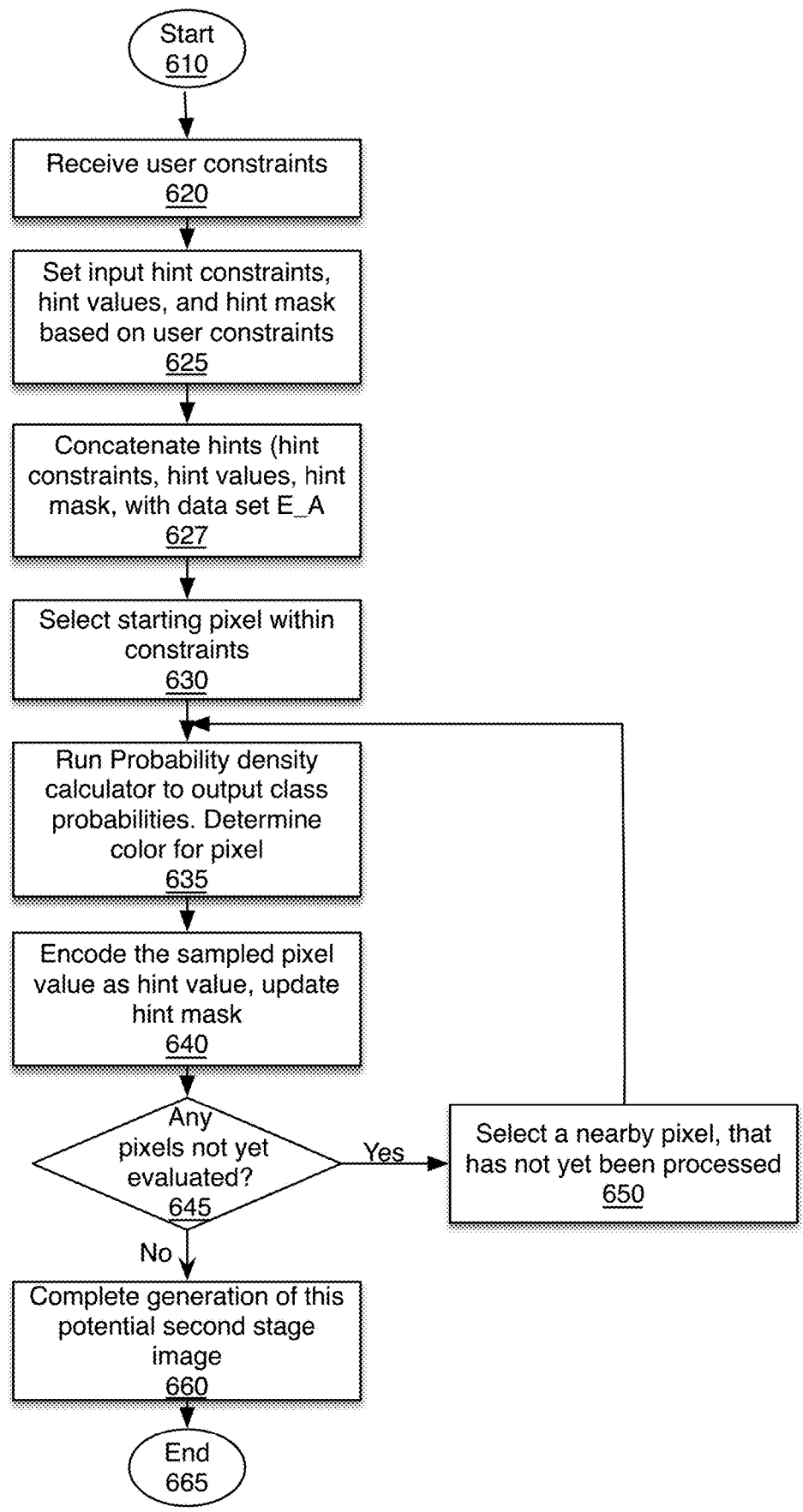
FIG. 6 illustrates a flowchart of a series of acts in a method of using the deep learning system in accordance with one or more embodiments.

FIG. 6 illustrates a flowchart of a series of acts in a method of using the deep learning system in accordance with one or more embodiments. The process starts at block 610.

At block 620, one or more user constraints are received. User constraints are guidance or preferences provided by the user, to narrow the possible outcomes of the design. For example, a user preference for a vector to color process of a character, may be to restrict the character's hair color to a particular color, or color subset. For a flat color to shading process, the user constraint may restrict the direction of the light. Other constraints may be received. For example, other constraints may include controlling the depth/amount of shadow, the color of the light, or other lighting configurations including having more than one light or using a spot light, etc.

At block 625, the hint constraints, hint values, and hint mask are set based on the user constraints. For example, if the character's hair color is chosen, the pixels associated with that portion of the image are set to the selected color, and the associated hint mask locations are set to one. For another example, if the light is selected to impact the flat color image from a certain angle, a portion of the image may have the shade set white/no shade, with the corresponding hint mask elements set to one. As discussed above, constraints may be encoded in a combination of additional hint constraint channels, hint values which impact the neural network probability calculations, and hint mask which reflects values included in the hint values and the area(s) of calculation.

At block 627, the hints, which include hint values, hint masks, and hint constraints, are concatenated with the input image data.

At block 630, a starting pixel is selected within the constraints. In one embodiment, if there is a block of pixels that are set based on the user constraints, the starting pixel is selected to spiral outward from those pixels. In another embodiment, the starting pixel may be selected randomly, within the constraints.

At block 635, the probability density calculator calculates a probability density function using the concatenated data, which predicts the probability distributions over the quantized values of B. The color is then determined for a pixel location. In one embodiment, the system randomly selects a first pixel. In another embodiment, if a user guidance is available, the first pixel selection may be made based on the user guidance.

At block 640, the encoded sample pixel is encoded as hint value, and sets the corresponding position in the hint mask to 1.

At block 645, the process determines whether there are any pixels remain unevaluated. If so, a nearby pixel that has not yet been processed is selected, at block 650. The system spirals outward until an unevaluated pixel is selected, in one embodiment. In one embodiment, the nearby pixels are selected in a spiral pattern, such that the evaluation spirals out from the originally selected pixel. The process then returns to block 635, to concatenate E_A with the newly updated hint mask and hint value and re-evaluate.

If no pixels remain unevaluated, at block 660, the process finalizes this particular potential design. This process may be run multiple times to create different potential second stage images.

In one embodiment, the system utilizes the encoding mechanism described above in blocks 440-460, to obtain the reconstructed value for dataset B, which is the updated image, at the next image stage. The process then ends at block 665.

Figure 7:
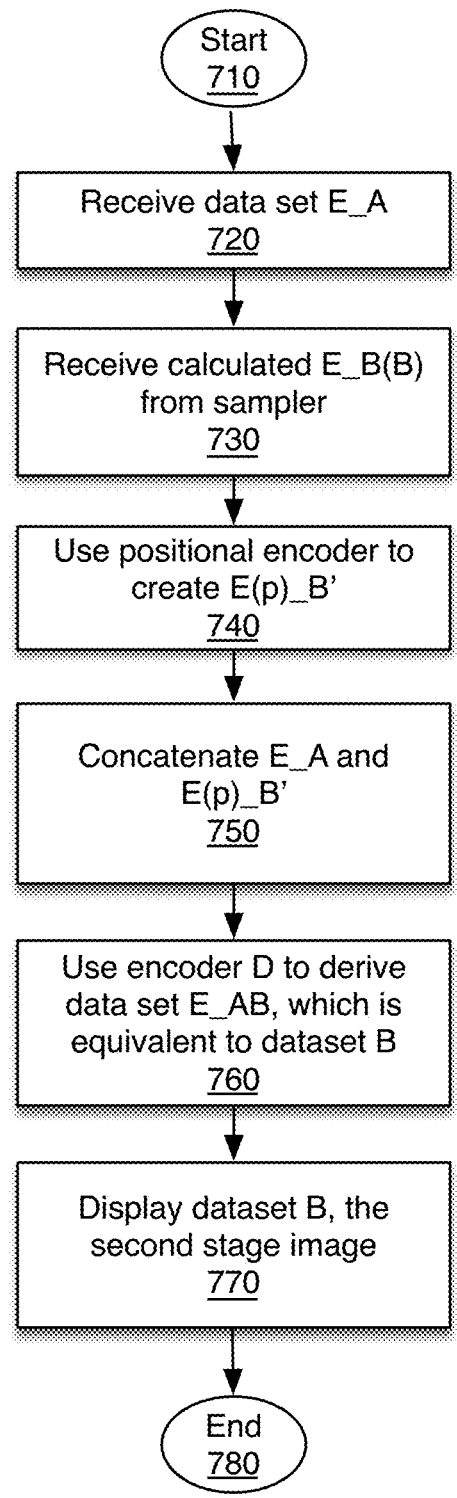
FIG. 7 illustrates a flowchart of a series of acts in a method of generating the candidate image in accordance with one or more embodiments.

FIG. 7 illustrates a flowchart of a series of acts in a method of generating the candidate image in accordance with one or more embodiments. FIG. 7 in one embodiment corresponds to block 660 of FIG. 6, or block 555 of FIG. 5. The process starts at block 710.

At block 720, the data set E_A is received. The data set E_A was used in the generation of the probabilities, and E_B(B), as described above. The calculated values of E_B (B) derived based on the sampling of the probabilities, in one embodiment, are received at block 730.

At block 740, a positional encoder is used to encode E_B(B) to create E(p)_B'. The positional encoding is used to move from the compact format of the calculated E_B(B) to a size that is comparable to data set E_A.

At block 750, the data sets E_A and E(p)_B' are concatenated.

At block 760, the encoder D is used to derive the data set E_AB from the concatenated value. As discussed above, the data set E_AB is functionally equivalent to the data set B. Data set B, as previously noted, is the second stage image. Therefore, at block 770, the data set B, second stage image, is displayed to the user. The process then ends, at block 780.

The present application uses a neural network, for its auto-regressive generative model. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. Additional details with respect to the use of neural networks within the image stage system are discussed below with respect to FIGS. 2A and 2B.

FIGS. 3-7 above illustrate flowcharts of exemplary methods in accordance with one or more embodiments. The methods described in relation to FIGS. 3-7 may be performed with fewer or more steps/acts or the steps/acts may be performed in differing orders. Additionally, the steps/acts described herein may be repeated or performed in parallel with one another or in parallel with different instances of the same or similar steps/acts.

Figure 10:
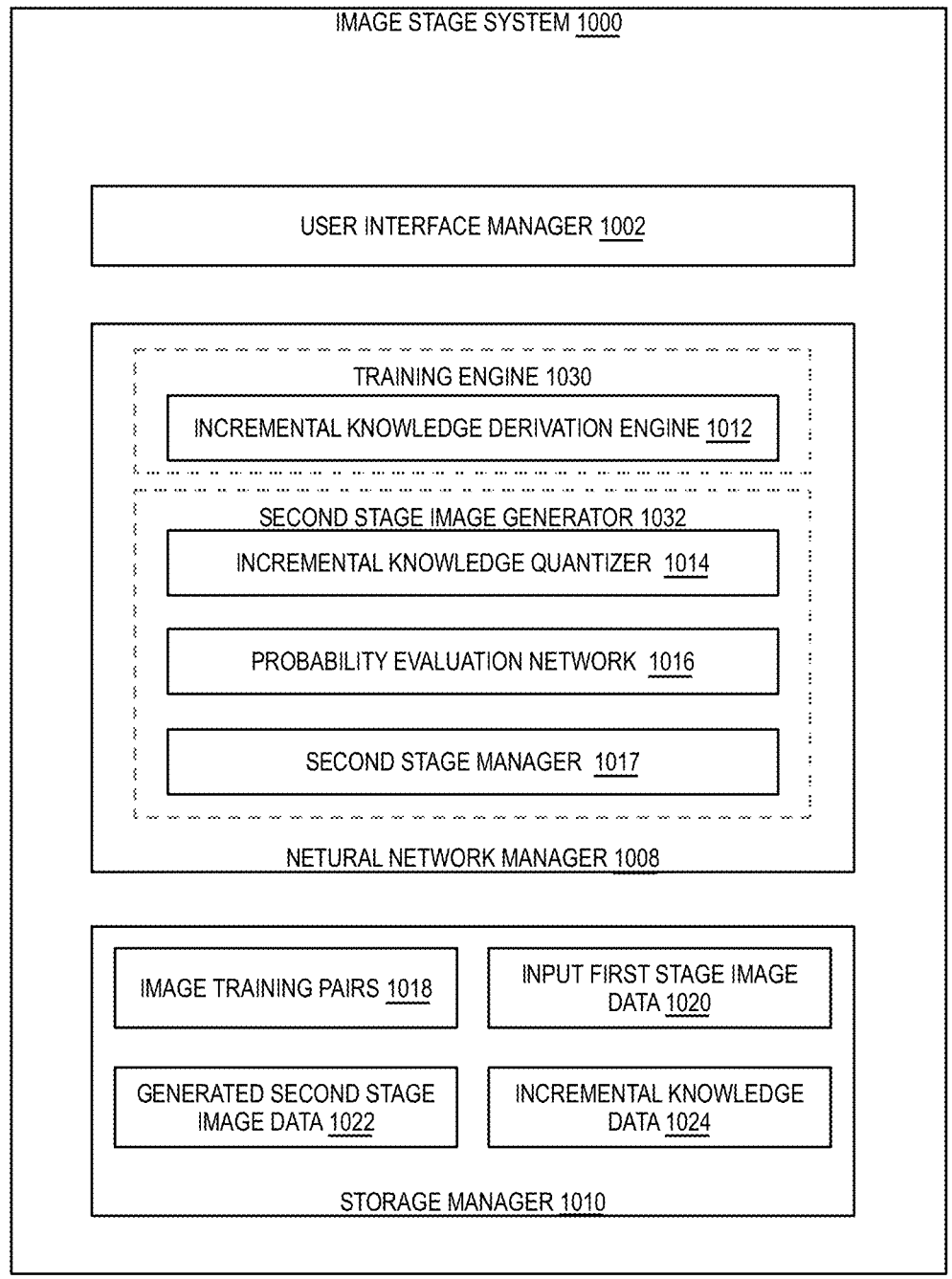
FIG. 10 illustrates a schematic diagram of image stage system (e.g., "image stage system" described above) in accordance with one or more embodiments.

FIG. 10 illustrates a schematic diagram of image stage system (e.g., "image stage system" described above) in accordance with one or more embodiments. As shown, the image stage system 1000 may include, but is not limited to, user interface manager 1002, neural network manager 1008, and storage manager 1010. The neural network manager 1008 includes a training engine 1030 and a second image stage generator 1032. The second stage image generator 1032 includes incremental knowledge quantizer 1014, probability evaluation network 1016, and second stage manager 1017. The storage manager 1010 includes training image pairs 1018, input first stage image data 1020, generated second stage image data 1022, and incremental knowledge data 1024.

As illustrated in FIG. 10 the image stage system 1000 includes a user interface manager 1002. For example, the user interface manager 1002 allows users to select one or more input images to be processed by the image stage system. In some embodiments, the user interface manager 1002 enables a user to select one or more files which include first stage image data 1020 and are stored or accessible by storage manager 1010. In some embodiments, the user interface manager 1002 enables the user to select a specific portion of the input image data (e.g., one or more vector objects from among a larger collection of vector objects) from the one or more files to be processed by the image stage system 1000. Additionally, the user interface manager 1002 allows users to request the image stage system to generate one or more second stage variations (e.g., generated second stage image data 1022). Further, the user interface manager 1002 allows users to view the second stage variations and select one or more of the variations for continued editing. In some embodiments, image stage system 1000 may be presented to the user via a user interface element managed by the user interface manager 1002, such as a sidebar, pop-up window, or other visual element as part of a user interface provided by an image processing application (such as a vector graphics application) in which the image stage system may be incorporated.

As illustrated in FIG. 10 the image stage system 1000 also includes neural network manager 1008. Neural network manager 1008 may include (e.g., host, manage, etc.) one or more machine learning models that are used to generate a second stage image from a first stage image. In some embodiments, the user interface manager 1002 can receive a first stage image and coordinate other components of the image stage system 1000 to generate one or more second stage images. For example, as discussed, an input first stage can include a vector drawing, or a flat color drawing. If the digital image is a vector drawing, the user interface manager 1002 can use the second image stage generator 1032 to generate the second stage image. The second stage image generator 1032 includes incremental knowledge quantizer 1014, probability evaluation network 1016, and second stage manager 1017. The second stage generator 1032 may include a neural network, such as a R-CNN, that has been trained to generate the second stage image. The second stage image generator 1032 can output one or more second stage images, based on the received first stage image.

As illustrated in FIG. 10 the image stage system 1000 also includes training engine 1030. The training engine 1030 can teach, guide, tune, and/or train one or more neural networks. In particular, the training engine 1030 can train a neural network based on a plurality of training data (e.g., image training pairs 1018). As discussed, the training images 1018 may include paired sets of digital images including first stage and second stage representations of objects, scenes, etc. More specifically, the training engine 1030 can access, identify, generate, create, and/or determine training input and utilize the training input to train and fine-tune a neural network. For instance, the training engine 1030 can train the incremental knowledge derivation engine, as discussed above in detail with respect to FIG. 4.

As illustrated in FIG. 10, the image stage system 1000 also includes the storage manager 1010. The storage manager 1010 maintains data for the image stage system 1000. The storage manager 1010 can maintain data of any type, size, or kind as necessary to perform the functions of the image stage system 1000. The storage manager 1010, as shown in FIG. 10, includes the image pairs 1018 used to train the training engine 1030. The image pairs 1018 can include a plurality of paired digital training images associated with various first stage and second stage images, as discussed in detail above. In particular, in one or more embodiments, the training images 1018 include digital training images utilized by the neural network training engine 1012 to train one or more neural networks to generate second stage images.

As further illustrated in FIG. 10, the storage manager 1010 also includes input first stage image data 1020. First stage image data 1020 can include information for any digital image utilized by the image stage system 1000. For example, first stage image data 1020 includes a digital vector image provided by a user, where the user seeks to generate a second stage image. The storage manager 1010 may also include second stage image data 1022 generated by the second stage image generator 1032. The storage manager 1010 also includes incremental knowledge data 1024, derived by training engine 1030 from the image training pairs 1018.

Each of the components 1002-1032 of the image stage system 1000 and their corresponding elements (as shown in FIG. 10) may be in communication with one another using any suitable communication technologies. It will be recognized that although components 1002-1032 and their corresponding elements are shown to be separate in FIG. 10, any of components 1002-1032 and their corresponding elements may be combined into fewer components, such as into a single facility or module, divided into more components, or configured into different components as may serve a particular embodiment.

The components 1002-1032 and their corresponding elements can comprise software, hardware, or both. For example, the components 1002-1032 and their corresponding elements can comprise one or more instructions stored on a computer-readable storage medium and executable by processors of one or more computing devices. When executed by the one or more processors, the computer-executable instructions of the image stage system 1000 can cause a client device and/or a server device to perform the methods described herein. Alternatively, the components 1002-1032 and their corresponding elements can comprise hardware, such as a special purpose processing device to perform a certain function or group of functions. Additionally, the components 1002-1032 and their corresponding elements can comprise a combination of computer-executable instructions and hardware.

Furthermore, the components 1002-1032 of the image stage system 1000 may, for example, be implemented as one or more stand-alone applications, as one or more modules of an application, as one or more plug-ins, as one or more library functions or functions that may be called by other applications, and/or as a cloud-computing model. Thus, the components 1002-1032 of the image stage system 1000 may be implemented as a stand-alone application, such as a desktop or mobile application. Furthermore, the components 1002-1032 of the image stage system 1000 may be implemented as one or more web-based applications hosted on a remote server. Alternatively, or additionally, the components of the image stage system 1000 may be implemented in a suit of mobile device applications or "apps." To illustrate, the components of the image stage system 1000 may be implemented as part of an application, or suite of applications, including but not limited to ADOBE CREATIVE CLOUD, ADOBE PHOTOSHOP, ADOBE ACROBAT, ADOBE ILLUSTRATOR, ADOBE LIGHTROOM and ADOBE INDESIGN. "ADOBE", "CREATIVE CLOUD," "PHOTOSHOP," "ACROBAT," "ILLUSTRATOR," "LIGHTROOM," and "INDESIGN" are either registered trademarks or trademarks of Adobe Inc. in the United States and/or other countries.

Figure 11:
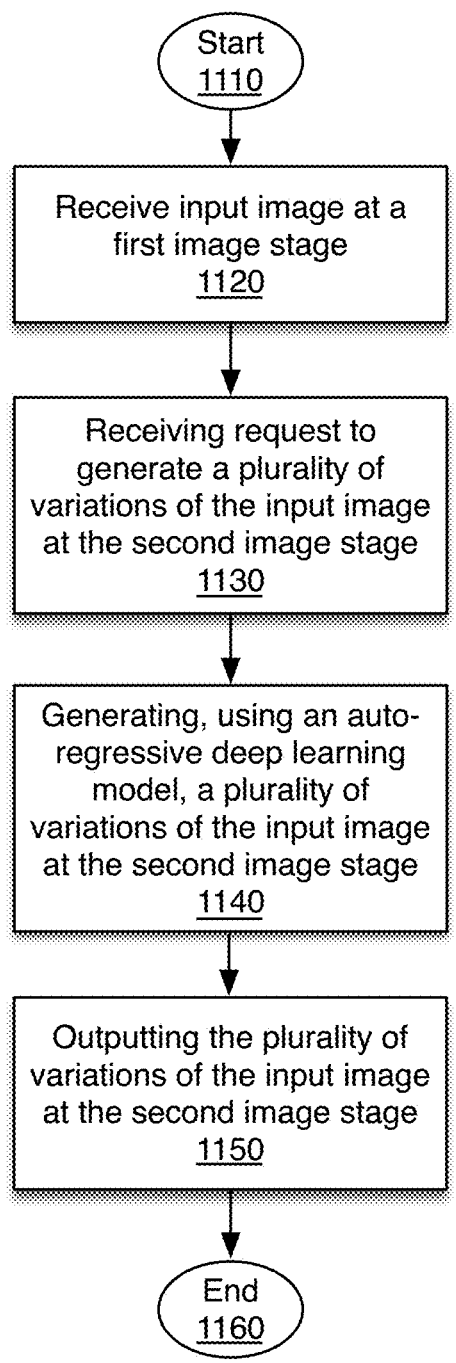
FIG. 11 illustrates a flowchart of a series of acts in a method of utilizing the image stage system in accordance with one or more embodiments.

FIGS. 1-10, the corresponding text, and the examples, provide a number of different systems and devices that allows the creation of a second stage image from a first stage image. In addition to the foregoing, embodiments can also be described in terms of flowcharts comprising acts and steps in a method for accomplishing a particular result. For example, FIG. 11 illustrates flowcharts of exemplary methods in accordance with one or more embodiments. The method described in relation to FIG. 11 may be performed with fewer or more steps/acts or the steps/acts may be performed in differing orders. Additionally, the steps/acts described herein may be repeated or performed in parallel with one another or in parallel with different instances of the same or similar steps/acts.

FIG. 11 illustrates a flowchart 1100 of a series of acts in a method of generating a second stage image in accordance with one or more embodiments. In one or more embodiments, the method 1100 is performed in a digital medium environment that includes the image stage system 1000. The method 1100 is intended to be illustrative of one or more methods in accordance with the present disclosure and is not intended to limit potential embodiments. Alternative embodiments can include additional, fewer, or different steps than those articulated in FIG. 11.

The process starts at block 1110. As illustrated in FIG. 11, the method 1100 includes an act 1120 of receiving an input image at a first image stage. The image may be a vector drawing or a flat color drawing, or another first stage drawing, as discussed above.

As illustrated in FIG. 11, the method 1100 also includes an act 1130 of, receiving a request to generate a plurality of variations of the input image at a second image stage. The second image stage, in one embodiment, is adding color to a vector drawing, adding color shading to a flat color drawing, or otherwise updating the image to a second image stage.

As illustrated in FIG. 11, the method 1100 also includes an act 1140 of generating, using an auto-regressive generative deep learning model, the plurality of variations of the input image at the second image stage. The system is auto-regressive because it starts by guessing some part of the image, and spirals outward from this decision. The autoregressive nature of the model makes it easy to generate many diverse examples, by starting from a different originating pixel.

As illustrated in FIG. 11, the method 1100 also includes an act 1150 of outputting the plurality of variations of the input image at the second image stage. In one embodiment, the user may select one or more of the variations for further editing or use. The process then ends, at block 1160. In this way, the system provides an easy to use tool to improve the design process by providing a variety of potential next image stages for use by an artist or user.

Figure 12:
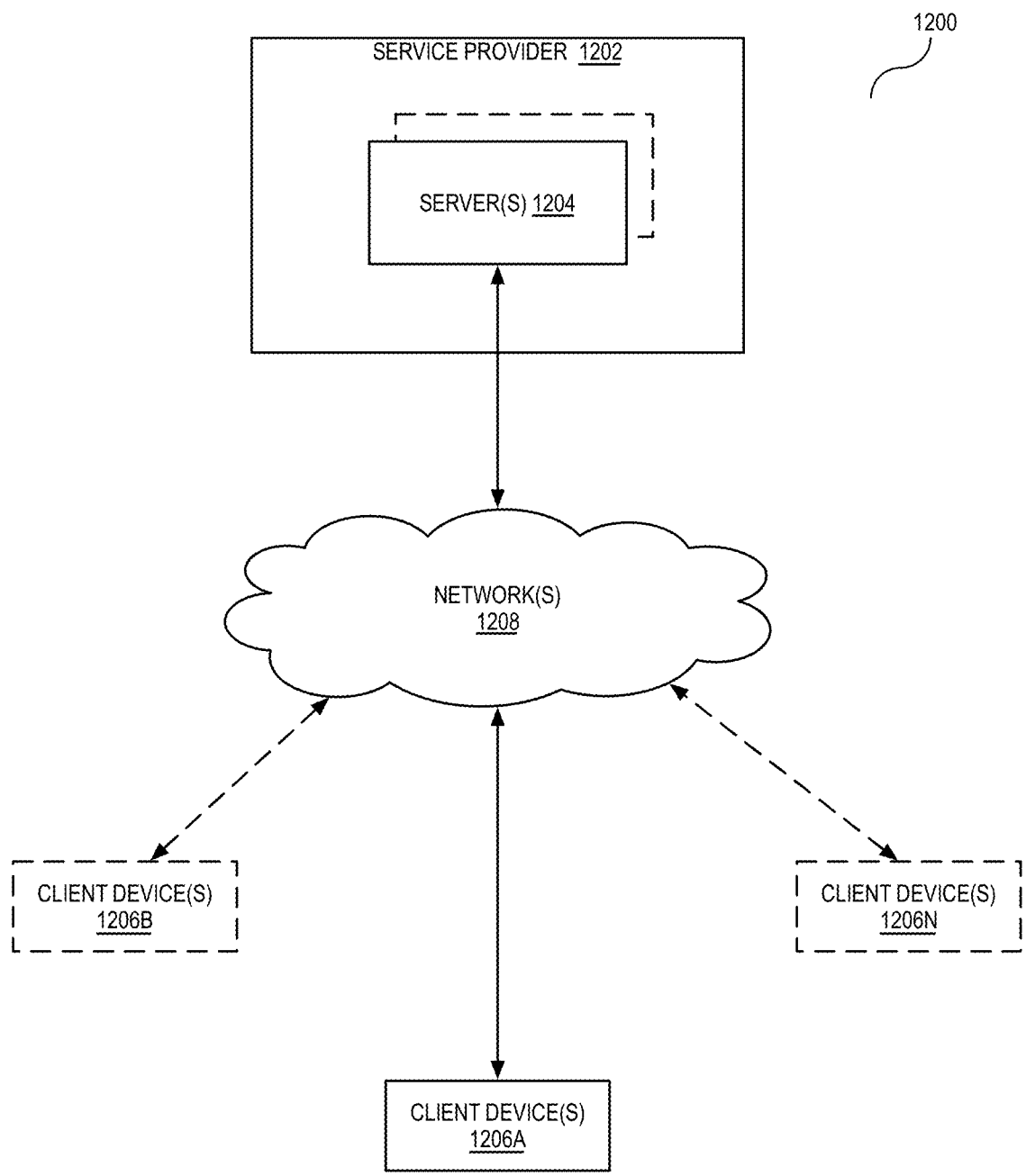
FIG. 12 illustrates a schematic diagram of an exemplary environment in which the image processing system can operate in accordance with one or more embodiments.

FIG. 12 illustrates a schematic diagram of an exemplary environment 1200 in which the image stage system 1000 can operate in accordance with one or more embodiments. In one or more embodiments, the environment 1200 includes a service provider 1202 which may include one or more servers 1204 connected to a plurality of client devices 1206A-1206N via one or more networks 1208. The client devices 1206A-1206N, the one or more networks 1208, the service provider 1202, and the one or more servers 1204 may communicate with each other or other components using any communication platforms and technologies suitable for transporting data and/or communication signals, including any known communication technologies, devices, media, and protocols supportive of remote data communications, examples of which will be described in more detail below with respect to FIG. 13.

Although FIG. 12 illustrates a particular arrangement of the client devices 1206A-1206N, the one or more networks 1208, the service provider 1202, and the one or more servers 1204, various additional arrangements are possible. For example, the client devices 1206A-1206N may directly communicate with the one or more servers 1204, bypassing the network 1208. Or alternatively, the client devices 1206A-1206N may directly communicate with each other. The service provider 1202 may be a public cloud service provider which owns and operates their own infrastructure in one or more data centers and provides this infrastructure to customers and end users on demand to host applications on the one or more servers 1204. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1204. In some embodiments, the service provider may be a private cloud provider which maintains cloud infrastructure for a single organization. The one or more servers 1204 may similarly include one or more hardware servers, each with its own computing resources, which are divided among applications hosted by the one or more servers for use by members of the organization or their customers.

Similarly, although the environment 1200 of FIG. 12 is depicted as having various components, the environment 1200 may have additional or alternative components. For example, the environment 1200 can be implemented on a single computing device with the image stage system 1000. In particular, the image stage system 1000 may be implemented in whole or in part on the client device 1202A.

As illustrated in FIG. 12, the environment 1200 may include client devices 1206A-1206N. The client devices 1206A-1206N may comprise any computing device. For example, client devices 1206A-1206N may comprise one or more personal computers, laptop computers, mobile devices, mobile phones, tablets, special purpose computers, TVs, or other computing devices, including computing devices described below with regard to FIG. 13. Although three client devices are shown in FIG. 12, it will be appreciated that client devices 1206A-1206N may comprise any number of client devices (greater or smaller than shown).

Moreover, as illustrated in FIG. 12, the client devices 1206A-1206N and the one or more servers 1204 may communicate via one or more networks 1208. The one or more networks 1208 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1208 may be any suitable network over which the client devices 1206A-1206N may access service provider 1202 and server 1204, or vice versa. The one or more networks 1208 will be discussed in more detail below with regard to FIG. 13.

In addition, the environment 1200 may also include one or more servers 1204. The one or more servers 1204 may generate, store, receive, and transmit any type of data, including training image pair data 1018, input first stage image data 1020, generated second stage image data 1022, or other information. For example, a server 1204 may receive data from a client device, such as the client device 1206A, and send the data to another client device, such as the client device 1202B and/or 1202N. The server 1204 can also transmit electronic messages between one or more users of the environment 1200. In one example embodiment, the server 1204 is a data server. The server 1204 can also comprise a communication server or a web-hosting server. Additional details regarding the server 1204 will be discussed below with respect to FIG. 13.

As mentioned, in one or more embodiments, the one or more servers 1204 can include or implement at least a portion of the image stage system 1000. In particular, the image stage system 1000 can comprise an application running on the one or more servers 1204 or a portion of the image stage system 1000 can be downloaded from the one or more servers 1204. For example, the image stage system 1000 can include a web hosting application that allows the client devices 1206A-1206N to interact with content hosted at the one or more servers 1204. To illustrate, in one or more embodiments of the environment 1200, one or more client devices 1206A-1206N can access a webpage supported by the one or more servers 1204. In particular, the client device 1206A can run a web application (e.g., a web browser) to allow a user to access, view, and/or interact with a webpage or website hosted at the one or more servers 1204.

Upon the client device 1206A accessing a webpage or other web application hosted at the one or more servers 1204, in one or more embodiments, the one or more servers 1204 can provide access to one or more digital images (e.g., the input first stage image data 1020, such as line drawings, or flat color images) stored at the one or more servers 1204. Moreover, the client device 1206A can receive a request (i.e., via user input) to generate a second stage image based on the first stage image data 1020, and provide the request to the one or more servers 1204. Upon receiving the request, the one or more servers 1204 can automatically perform the methods and processes described above to generate potential second stage images. The one or more servers 1204 can provide one or more second stage images to the client device 1206A for display to the user.

As just described, the image stage system 1000 may be implemented in whole, or in part, by the individual elements 1202-1208 of the environment 1200. It will be appreciated that although certain components of the image stage system 1000 are described in the previous examples with regard to particular elements of the environment 1200, various alternative implementations are possible. For instance, in one or more embodiments, the image stage system 1000 is implemented on any of the client devices 1206A-1206N. Similarly, in one or more embodiments, the image stage system 1000 may be implemented on the one or more servers 1204. Moreover, different components and functions of the image stage system 1000 may be implemented separately among client devices 1206A-1206N, the one or more servers 1204, and the network 1208.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
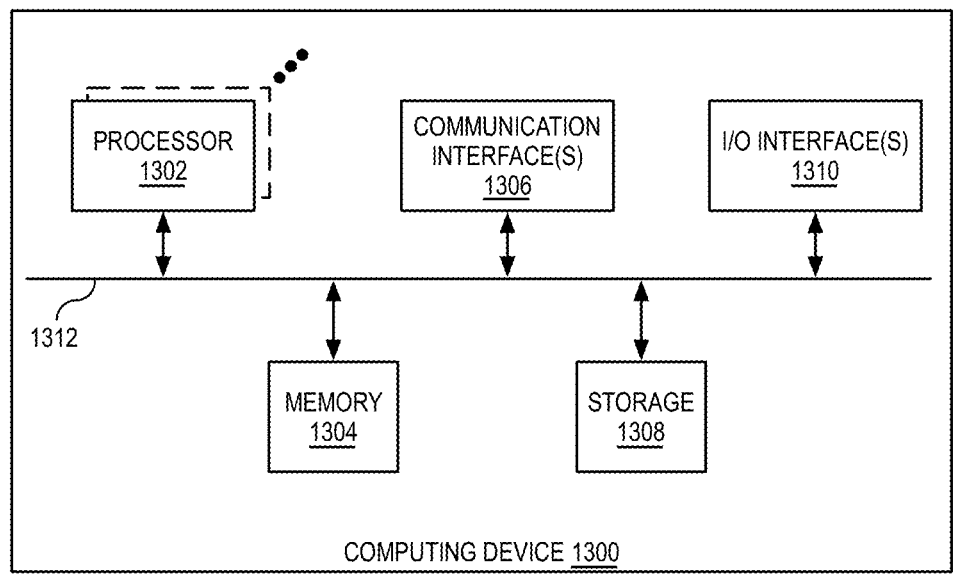
FIG. 13 illustrates a block diagram of an exemplary computing device in accordance with one or more embodiments.

FIG. 13 illustrates, in block diagram form, an exemplary computing device 1300 that may be configured to perform one or more of the processes described above. One will appreciate that one or more computing devices such as the computing device 1300 may implement the image processing system. As shown by FIG. 13, the computing device can comprise a processor 1302, memory 1304, one or more communication interfaces 1306, a storage device 1308, and one or more I/O devices/interfaces 1310. In certain embodiments, the computing device 1300 can include fewer or more components than those shown in FIG. 13. Components of computing device 1300 shown in FIG. 13 will now be described in additional detail.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1308 and decode and execute them. In various embodiments, the processor(s) 1302 may include one or more central processing units (CPUs), graphics processing units (GPUs), field programmable gate arrays (FPGAs), systems on chip (SoC), or other processor(s) or combinations of processors.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1304 may be internal or distributed memory.

The computing device 1300 can further include one or more communication interfaces 1306. A communication interface 1306 can include hardware, software, or both. The communication interface 1306 can provide one or more interfaces for communication (such as, for example, packet-based communication) between the computing device and one or more other computing devices 1300 or one or more networks. As an example, and not by way of limitation, communication interface 1306 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can comprise hardware, software, or both that couples components of computing device 1300 to each other.

The computing device 1300 includes a storage device 1308 includes storage for storing data or instructions. As an example, and not by way of limitation, storage device 1308 can comprise a non-transitory storage medium described above. The storage device 1308 may include a hard disk drive (HDD), flash memory, a Universal Serial Bus (USB) drive or a combination these or other storage devices. The computing device 1300 also includes one or more input or output ("I/O") devices/interfaces 1310, which are provided to allow a user to provide input to (such as user strokes), receive output from, and otherwise transfer data to and from the computing device 1300. These I/O devices/interfaces 1310 may include a mouse, keypad or a keyboard, a touch screen, camera, optical scanner, network interface, modem, other known I/O devices or a combination of such I/O devices/interfaces 1310. The touch screen may be activated with a stylus or a finger.

The I/O devices/interfaces 1310 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1310 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
   receiving an input image at a first image stage;
   receiving a request to generate a plurality of variations of the input image at a second image stage;
   encoding the input image into a high bandwidth art feature space;
   generating, using an auto-regressive generative deep learning model, the plurality of variations of the input image at the second image stage using the encoded high bandwidth art feature space and incremental knowledge from the auto-regressive generative deep learning model, wherein the auto-regressive generative deep learning model is trained to determine the incremental knowledge based on a concatenation of high bandwidth art feature spaces of training images at the first image stage and compressed low bandwidth characteristic feature spaces of the training images at the second image stage; and
   outputting the plurality of variations of the input image at the second image stage.

2. The method of claim 1, wherein the first image stage comprises a line drawing, and the second image stage comprises a colored image.

3. The method of claim 1, wherein the first image stage comprises a flat color image, and the second image stage comprises a colored image with shading.

4. The method of claim 1, further comprising training the auto-regressive generative deep learning model by:
   receiving artwork pairs, for each pair a first image representing the first image stage, and a second image representing the second image stage;
   encoding, by a first encoder, the first image into a high bandwidth art feature space;
   encoding, by a second encoder, the second image into a compressed low bandwidth characteristic feature space, encoding a delta between the first image stage and the second image stage;
   concatenating the encoded art feature space and characteristic feature space to encode incremental knowledge to derive the second image stage from the first image stage; and
   storing the incremental knowledge.

5. The method of claim 4, wherein the first encoder is a residual network encoder and down sampling layer.

6. The method of claim 4, wherein the second encoder is a residual network encoder with a plurality of down sampling layers.

7. The method of claim 4, further comprising:
   quantizing each value of the encoded second image into a discrete set of buckets;
   concatenating a hint value, a hint mask, and the high bandwidth art feature space; and
   calculating class probabilities over each of the values of the characteristic feature space.

8. The method of claim 7, wherein the calculating the class probabilities comprises:
   randomly selecting one of the values of the characteristic feature space as a starting point;
   sampling from the randomly selected value according to an output of the class probabilities;
   encoding a corresponding sampled value as an updated hint value, and mark a corresponding position in an updated hint mask;
   rerunning the class probabilities calculation, with the updated hint value and the updated hint mask; and
   select a nearby point and repeat.

9. The method of claim 8, wherein a nearby position is selected in a spiral.

10. The method of claim 8, further comprising:
    receiving a constraint from a user;
    identifying one or more of: hint constraints, and adjustments to the hint value and the hint mask based on the constraint, wherein the concatenating includes the hint constraints; and
    selecting one of the values as the starting point, based on the adjustments to the hint mask.

11. The method of claim 8, wherein:
    after calculating all probabilities from the randomly selected value, selecting a different random starting point.

12. The method of claim 8, wherein each iteration of the calculating produces a potential second image stage, the method further comprising:
    displaying a plurality of the potential second image stages to a user; and
    enabling the user to select one of the potential second image stages for further editing.

13. A non-transitory computer-readable storage medium including instructions stored thereon which, when executed by at least one processor, cause the at least one processor to:
    receive an input image at a first image stage;
    receive a request to generate a plurality of variations of the input image at a second image stage;
    encode the input image into a high bandwidth art feature space;
    generate, using an auto-regressive generative deep learning model, the plurality of variations of the input image at the second image stage using the encoded high bandwidth art feature space and incremental knowledge from the auto-regressive generative deep learning model, wherein the auto-regressive generative deep learning model is trained to determine the incremental knowledge based on a concatenation of high bandwidth art feature spaces of training images at the first image stage and compressed low bandwidth characteristic feature spaces of the training images at the second image stage; and
    output the plurality of variations of the input image at the second image stage.

14. The non-transitory computer-readable storage medium of claim 13, wherein:
    the first image stage comprises a line drawing, and the second image stage comprises a colored image, or
    the first image stage comprises a flat color image, and the second image stage comprises a colored image with shading.

15. The non-transitory computer-readable storage medium of claim 13, further comprising instructions to train the auto-regressive generative deep learning model by:
    receiving artwork pairs, for each pair a first image representing the first image stage, and a second image representing the second image stage;
    encoding, by a first encoder, the first image into a high bandwidth art feature space;
    encoding, by a second encoder, the second image into a compressed low bandwidth characteristic feature space, encoding a delta between the first image stage and the second image stage;
    concatenating the encoded art feature space and characteristic feature space to encode incremental knowledge to derive the second image stage from the first image stage; and
    storing the incremental knowledge.

16. The non-transitory computer-readable storage medium of claim 15, wherein:
    the first encoder is a residual network encoder and down sampling layer, and
    the second encoder is a residual network encoder with a plurality of down sampling layers.

17. The non-transitory computer-readable storage medium of claim 15, wherein the instructions further comprise instructions for the processor to:
    quantize each value of the encoded second image into a discrete set of buckets;
    concatenate a hint value, a hint mask, and the high bandwidth art feature space; and
    calculate class probabilities over each of the values of the characteristic feature space.

18. The non-transitory computer-readable storage medium of claim 17, wherein the instructions to calculate the class probabilities further comprise instructions for the processor to:
    randomly select one of the values of the characteristic feature space as a starting point;
    sample from the randomly selected value according to an output of the class probabilities;
    encode a corresponding sampled value as an updated hint value, and mark a corresponding position in an updated hint mask;
    rerun the class probabilities calculation, with the updated hint value and the updated hint mask; and
    select a nearby point and repeat.

19. The non-transitory computer-readable storage medium of claim 18, wherein a nearby position is selected in a spiral.

\* \* \* \* \*